Jan. 10, 1956     C. E. RICKARD     2,730,116
GASKET VALVE
Filed April 15, 1954
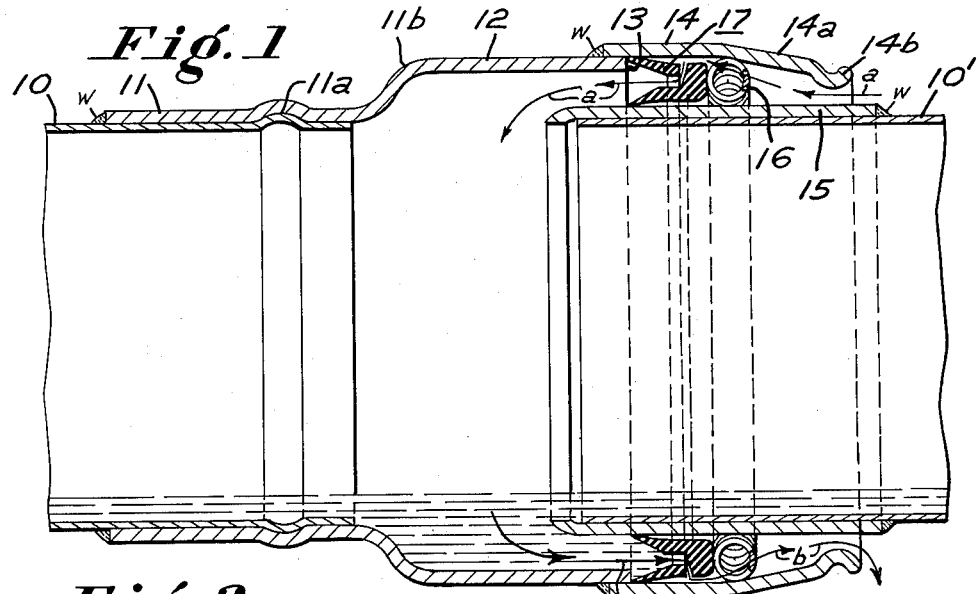
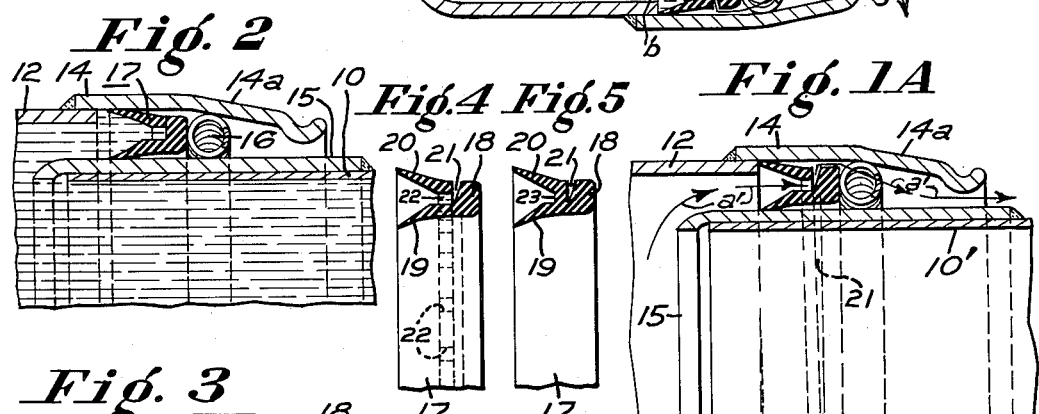
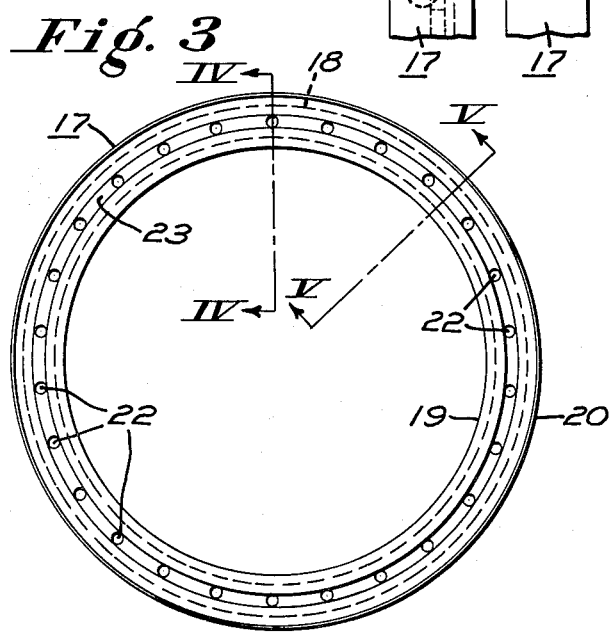
INVENTOR.
CLYDE E. RICKARD
BY Green, McCallister and Miller
his Attorneys.

United States Patent Office 2,730,116
Patented Jan. 10, 1956

2,730,116

GASKET VALVE

Clyde E. Rickard, Pittsburgh, Pa., assignor to McDowell Manufacturing Company, Millvale, Pa., a corporation of Pennsylvania Application April 15, 1954, Serial No. 423,295

9 Claims. (Cl. 137—107)

This invention relates to a valved joint coupling system for a pipe line which employs a gasket valve means to seal off a pipe joint under line pressure and to vent or drain fluid from the pipe line and particularly, to an improved valve for draining the line when its sections are to be uncoupled and transported and for air-venting the line when its sections have been coupled and liquid is to be introduced into and flowed under pressure in the line. It also relates to an improved valve construction for normalizing air pressure and draining coupled sections which is operative peripherally about the sections and in co-operation with the joint between the sections.

The construction of my present invention has been devised particularly on the basis of the problem presented in connection with the employment of a series of interconnected pipe sections, such as employed in a portable irrigation system, and which may have suitable spray heads or openings along its length supplied with water under pump pressure. In such a system, the need is for a quick and positive acting valve which will quickly and effectively drain the pipe sections or the system when positive fluid pressure is released or water flow is stopped. The purpose is to automatically drain the sections of water, so that they may be uncoupled, transported to a new location, and re-employed. Upon re-employment of the sections when coupled together, a further factor arises in connection with atmospheric air in the pipe sections which has taken the place of the liquid. That is, I have determined it is important to provide effective means for venting such air to again quickly fill up the coupled sections with liquid under pressure and reinitiate an irrigating flow. In this connection, the air must be vented to substantially fully fill up the line with water and to apply the water under a uniform head, without spitting or surges due to entrained or entrapped air in the system.

As to the first portion of the problem relating to draining the pipe line, I have found that quick and effective drainage cannot be accomplished without immediate means for, in effect, providing an air pressure normalization or equalization within and without the pipe section from the standpoint of the atmospheric air. A simple example of this is the impossibility of pouring a fruit juice from a single opening in the lid of a can without an atmospheric air entry in the second opening in the lid.

I have discovered that drain valve constructions heretofore employed for irrigation pipe lines have been inefficient in their operation, because those devising them did not recognize the importance of proper air pressure equalization between the outside atmosphere and the atmosphere within the connected pipe sections and during both liquid draining and refilling operations. I have determined that an immediate or closely associated air flow area is required for active co-operation with a liquid flow area and that reliance cannot be placed upon air flow through an active liquid flow area or upon some form of remotely located air flow area, such as through an open end of the pipe line or through a spray head. When an airflow opening is remote from the active drainage area, any action accomplished is slow, inefficient and relatively ineffective, with the result that drainage is a relatively slow operation and air venting when fluid line pressure is again applied, is not substantially completely effected. The latter causes spitting of the spray heads and line surges which under some conditions may tend to release the holding action of coupled sections. Also, the type of drain valves now being used employ an opening in the bottom of the pipe section which necessitates somewhat accurately aligning each section from the standpoint of its drain opening when the sections are coupled together. In addition, there is a tendency for dirt and sludge to clog the opening and to adversely affect the operation of the valve.

My invention is particularly applicable to the employment of a so-called quick type of release and fluid-pressure-actuated grip coupling as, for example, shown in the Beyer et al. Patent No. 2,259,453 of October 21, 1941. In this connection, the valve means of my invention is equally effective, regardless of whether or not the grip coil has an initial engagement with the pipe section to be held, or has a somewhat spaced or clearance relationship with respect thereto before line pressure is applied. In other words, the valve of my invention operates effectively, regardless of whether or not the coupled sections are initially loosely mounted for an easier releasing action, or are more tightly mounted to provide an initial mechanical holding action on the pipe sections. It permits the utilization of a gasket construction wherein the wing portions thereof have an abutting or a tight relationship between the coupling body and the coupled pipe section or nose, even when no active line pressure is being applied.

It has thus been an object of my invention to provide an improved system for air pressure normalizing and draining a pipe line having coupled sections and particularly, quick-release coupled sections.

Another object of my invention has been to solve the problem heretofore presented in the art by conventional valve constructions utilized in connection with pipe sections;

A further object of my invention has been to develop an improved valve construction which will operate effectively in a peripheral manner about and in co-operation with the joint between a pair of coupled pipe line sections;

A still further object of my invention has been to devise an automatic relief and drain valve of simple construction which will enable a more speedy, efficient and effective utilization of pipe sections in an irrigation system, for example.

These and many other objects of my invention will appear to those skilled in the art from my disclosure and the description thereof.

In the drawings, Figure 1 is a side sectional view in elevation of a coupling joint system employing my invention and my valve construction; in this figure, the valve construction is shown in an open relationship when no fluid or liquid flow is being initiated from a pump into the line and the line is being drained preliminarily to uncoupling its sections and moving it to a new location;

Figure 1A is a fragmental view somewhat similar to Figure 1, but showing the operation of the valve construction of my invention when the pipe sections have been emptied of liquid, have been coupled together and an initial line or pump liquid flow has been initiated; in this connection, the bottom portions of the valve are closed by the positive fluid flow, while the still uncovered upper portions are open to relieve or vent air from the interior of the coupled sections;

Figure 2 is a fragmental section of the construction of Figure 1, but showing the coupled sections fully filled with liquid under line pressure and with the full extent of the valve closed off along the periphery of the pipe joint; this illustrates the operative relationship of the valve construction of my invention when the valve is fully closed and the pipe line is being used to supply, for example, irrigating water to spray heads;

Figure 3 is a front view in elevation of the valve construction of my invention as employed in a coupling gasket;

Figures 4 and 5 are fragmental, vertical sections taken, respectively, along the lines IV—IV and V—V of Figure 3 and illustrate details of the construction of the valve gasket of my invention.

In solving the previously outlined problem involved in this particular art, I conceived the idea of utilizing the gasket employed in sealing-off a coupling joint in such a manner that it will effectively act as a valve and do so about the periphery of the joint or, in other words, along its continuous length. I have eliminated the need for drain holes through walls of the pipe sections and the need for properly aligning such holes when the pipe sections are coupled together, employ the peripheral joint spacing or opening normally provided by the coupled sections for utilization by the valve, eliminate the need for a loose positioning of the grip coil of the coupling to permit drainage, and utilize the full peripheral extent of the coupling joint in a highly effective and efficient manner. The gasket is devised and constructed to effectively act both as an air relief or an atmospheric air pressure equalization valve and a fluid or liquid drain valve by providing it with spaced valve passages or openings along its continuous length. Further in accordance with my invention, the valve structure is incorporated in a flexible, resilient or somewhat elastic (pressure-sensitive) sealing gasket which may also serve to provide a pressure heel for the application of holding force to a coupling grip coil.

The construction has a series of spaced-apart valve openings that with a flexible or resilient heel closure flap, define an annular valve area about the gasket that operates automatically in a progressive manner to provide immediate air vent and liquid drain areas and the extent of each of which areas varies with the liquid level in the pipe line. In this connection, by way of example, when the pipe line is being drained, the active air vent area increases and the active liquid drain area decreases as the liquid level is lowered. This is advantageous in providing a substantially constant and fast liquid flow rate, in that effective gravity flow pressure of the liquid in a pipe section lowers as its level lowers and immediate air replacement in the pipe section becomes progressively more important.

In the drawings, I have shown a representative type of coupling construction suitable for utilizing the valve construction of my invention. Referring particularly to Figure 1, the coupled pipe sections are represented by 10 and 10'. A coupling housing body is shown having a mounting sleeve portion 11 that is secured over the end portion of the pipe section 10 by an offset rolled-out joint 11a. The portion 11 is connected by an outwardly-offset shoulder portion 11b to a cylindrical portion 12 of greater diameter upon the outer end portion of which an active or operating surface carrying coupling body part 14 is secured thereon as by weld metal w.

An annular or cylindrical portion of the part 14 has an inner diameter or periphery which is radially-outwardly-offset with respect to the inner diameter or periphery of the portion 12 and which, with the end or thickness edge 13 of such portion, defines a positioning stop or abutment for an annular or continuous valve gasket 17. The grip-active fore portion of the coupling body has a forwardly-converging, smoothly-sloped, cone-shaped throat 14a which extends from the cylindrical portion and terminates in a lip edge 14b. The end portion of the other pipe section 10' is shown provided with a coupling nose or reinforcement sleeve 15 secured thereto as by weld metal w to provide an external operating surface. The sleeve 15 extends into the coupling housing and in an opposed and radially spaced-apart relation with the internal operating surface of its part 14, see Figure 1. A grip coil or annulus 16 having spaced-apart convolutions, as described and disclosed in the above-mentioned Beyer patent, is mounted in a co-operative operating relationship with the gasket 17 and in an operative relationship with respect to the throat portion 14a of the coupling as well as with respect to the external operating surface or outer periphery of the nose part 15.

The gasket 17, as shown particularly in Figures 3, 4 and 5, has a pressure-sensitive heel or flap portion 18 which cooperates with the grip coil 16 to advance it and hold it in a locking or gripping relationship between the throat portion 14a and the nose part 15 of the pipe section 10' to be held. A pair of backwardly-extending side wings 19 and 20, of an outwardly-flared U-shape, are integrally connected with the heel or flap portion 18 to receive fluid under pressure and to expand radially-outwardly and inwardly as well as press forwardly against the heel or flap portion 18 under positive line pressure. A continuous, annular slot or passageway 21 extends peripherally between the portion 18 and the outer wing portion 20 and is normally open or connected to a series of spaced-apart valve openings or ports 22.

It is apparent that the valve ports 22 extend through a valley or conecting base flange portion of the gasket, that lies between the wings 19 and 20, that is normally in a spaced relationship with respect to the portion 18 by reason of the slot or passageway 22, and against which the heel flap portion 18 is adapted to seat. It is also apparent that the portion 18 is connected integrally to the inner wing portion 19 and that the outer wing portion 20 is connected integrally with the portion 18 through the flange or base portion 23. In Figure 3, I have shown the spaced relationship of the ports 22 about the continuous extent of the gasket 17 and in the flange or base portion 23. This is important, as illustrated particularly in Figures 1, 1A and 2.

As shown, the gasket 17 may be of a molded, one-piece construction of a suitable material, such as natural or synthetic rubber or of a flexible fabric material, and its flap or heel portion 18, as formed, defines the open slot 21 with the base portion 23. When positive fluid pressure is applied to the pressure chamber defined by the wings 19 and 20, the gasket, in effect, is forced forwardly against the grip coil 16. Thus, the passageway-defining portion of its pressure heel 18, see Figure 2, moves into close abutment with the base portion 23 to positively close-off fluid flow through the slot 21 and through the ports 22. This operation is effected simultaneously with the operation of advancing the grip coil 16 into a positive holding or gripping engagement between the coupling housing and pipe section 10' being held. Upon the release of positive fluid pressure, the resiliency, elasticity, or flexibility of the gasket 17 causes it to move backwardly with respect to the portion 18 to open the passageway or slot 21. At such time, air may enter into the pipe sections and liquid may be drained therefrom through the ports 22 and the passageway 21, as indicated by the respective arrows a and b of Figure 1.

Normally, when the coupled pipe sections 10 and 10' are empty or partially empty, as shown in Figure 1, there is an equalization of air pressure within and without the sections through the passageway of the gasket 17. However, when liquid is supplied under line pressure to an end of the pipe line through, for example, section 10, it will gradually build-up vertically in the connected pipe sections and progressively close-off the passageway 21 and the ports 22 from the lower towards the upper port areas of the gasket, see Figure 1A. At the same time, the still-exposed or non-covered ports 22, adjacent the upper portion of the gasket are open, and are actively effective in venting air from the system, see arrows a' of Figure 1A. This continues until the pipe sections are fully filled up and at which time, as shown in Figure 2, all the ports are fully closed so that no leakage occurs.

On the other hand, when the line pressure is relieved and drainage is to be initiated, the flap or heel portion 18 of the gasket moves along its extent to the positioning illustrated by Figure 1, opening the ports 22 fully, initiating liquid drainage, and progressively makes the ports 22, from the top towards the bottom portion of the gasket, available for air flow (see arrows *a* of Figure 1) which facilitates the drainage action (see arrows *b* of Figure 1). This is automatically and quickly effected, once positive line pressure on the liquid has been relieved.

What I claim is:

1. In a valve coupling for a joint between a housing body member and an adjacent end portion of a separable pipe section that when coupled together define a supply line to which liquid is to be supplied under positive line pressure, wherein the housing body member receives the adjacent end portion of the pipe section therein and defines an annular joint spacing therewith, and wherein latching means is carried by said coupling body to detachably engage and hold the adjacent end portion of the pipe section in position with respect to said body: a continuous sealing gasket to be operatively positioned between the housing body member and the adjacent end portion of the pipe section and in the spacing to seal off an inner portion of the joint from an outer portion of the joint when liquid is supplied to the supply line under line pressure, said gasket having a heel portion therealong defining a fluid passageway normally open to the inner and outer portions of the joint when line pressure is relieved, a backing portion for said heel portion, and said heel portion being pressed against said backing portion when line pressure is applied to positively close-off said passageway.

2. In a valve coupling for a joint between a housing body member and an adjacent end portion of a separable pipe section that when coupled together define a supply line to which liquid is to be supplied under positive line pressure, wherein the housing body member receives the adjacent end portion of the pipe section therein and defines an annular joint spacing therewith, and wherein latching means is carried by the housing body member to detachably engage and hold the adjacent end portion of the pipe section in position within the body member: a continuous sealing gasket operatively positioned between the body member and the adjacent end portion of the pipe section and in the spacing to seal-off an inner portion of the joint from an outer portion of the joint when liquid is supplied to the supply line under line pressure, said gasket having a fluid passageway portion thereabout normally open through said gasket to the inner and outer portions of the joint when line pressure is relieved, said gasket having a pressure-sensitive sealing flap to positively close-off said passageway portion when liquid is being supplied under line pressure, and said sealing flap defining air-pressure-equalization and water drain areas about said gasket with said passageway and along the joint when line pressure is relieved.

3. In a valve coupling for a joint between a housing body member and an adjacent end portion of a separable pipe section that when coupled together define a supply line to which liquid is to be supplied under positive line pressure, wherein the housing body member receives the adjacent end portion of the pipe section therein and defines an annular joint spacing therewith, and wherein an annular grip element is operatively positioned in the spacing within the housing body member to engage the adjacent end portion of the pipe section and hold it in position within the body member; an annular sealing gasket operatively positioned in the spacing within the housing body and behind the grip element and having base and side portions defining a fluid-pressure-sensitive chamber open to an inner portion of the joint to receive liquid from the supply line, said gasket having a heel portion defining a valve passageway therealong that is normally open to an outer portion of the joint and through said chamber to the inner portion of the joint when line pressure is relieved for providing fluid flow along the joint between the interior and exterior of the supply line, and said heel portion being pressure-sensitive upon the application of liquid under pressure to said chamber to hold the grip element in engagement with the adjacent end portion of the pipe section and close-off fluid flow through said passageway.

4. In a valve coupling for a joint between a housing body member and an adjacent end portion of a separable pipe section that when coupled together define a supply line to which liquid is to be supplied under positive line pressure, wherein the housing body member receives the adjacent end portion of the pipe section therein and defines an annular joint spacing therewith, and wherein an annular grip element is operatively positioned in the spacing within the housing body member to engage the adjacent end portion of the pipe section and hold it in position within the body member: an annular sealing gasket operatively positioned in the spacing within the housing body and having base and side portions defining a fluid-pressure-sensitive chamber open to an inner portion of the joint to receive liquid from the supply line, said base portion having a series of valve ports therethrough, said gasket having a heel portion defining a valve passageways therealong with said base portion that is normally open to an outer portion of the joint and to said ports when line pressure is relieved for providing fluid flow between the interior and exterior of the supply line, and said heel portion being flexibly connected to said base portion and being pressed between said base portion and said grip element to close-off said ports when liquid is supplied under line pressure to said chamber.

5. An improved valve construction to be operatively positioned in the annular joint spacing defined between a pair of detachably coupled pipe sections and seal-off fluid flow therebetween which comprises, an annular gasket, said gasket having a pair of spaced-apart portions to abut opposed portions of the pipe sections and defining a fluid receiving chamber, said gasket having a pair of operatively-connected valve portions in a normally spaced-apart relationship to define a fluid-flow passageway through said gasket between said side portions thereof, and at least one of said valve portions being sensitive to positively-applied pressure to seat upon the other of said valve portions and close-off said passageway.

6. An improved valve construction to be operatively positioned in the annular joint spacing defined between a pair of detachably coupled pipe sections and seal-off fluid flow therebetween which comprises, an annular gasket, said gasket having a pair of spaced-apart side portions to abut opposed portions of the pipe sections and defining a fluid receiving chamber. said gasket having a base portion connected to said side portions and defining a series of fluid ports through said side portions, a heel portion operatively connected to said base portion in an opposed seating relationship with said ports, and said heel portion being pressure-sensitive to open and close-off fluid flow through said ports.

7. An improved valve construction to be operatively positioned in the annular joint spacing defined between a pair of detachably coupled pipe sections and seal-off fluid flow therebetween which comprises, an annular gasket, said gasket having a pair of spaced-apart side portions to abut opposed portions of the pipe sections and defining a fluid receiving chamber, said side portions being connected at their base and having fluid ports therethrough, a heel portion flexibly connected to the base of said side portions and normally defining an annular fluid-flow passageway with respect thereto, and said heel portion being pressure-sensitive to open and close-off fluid flow through said passageway.

8. An improved valve construction to be operatively positioned in the annular joint spacing defined between a pair of detachably coupled pipe sections which comprise, an annular gasket, said gasket having a pair of side wing portions to abut opposed portions of the pipe sections and seal-off fluid flow between said side portions and the opposed portions, said side wing portions defining an open fluid-pressure-sensitive chamber in the gasket, said gasket having a base portion connected to said side wing portions and defining a series of fluid ports therethrough open to said chamber, a heel flap portion operatively connected to said base portion in an opposed seating relationship with said ports and said heel flap portion being pressure sensitive to open and close-off fluid flow through said ports.

9. An improved valve construction to be operatively positioned in the annular joint spacing defined between a pair of detachably coupled pipe sections which comprises, a resilient annular gasket, said gasket having a pair of side wing portions about its inner and outer peripheries to abut peripherally-opposed portions of the coupled pipe sections and seal-off fluid flow between said wing portions and the opposed portions, said gasket having an outer base portion connecting said wing portions and therewith defining a fluid-pressure-sensitive chamber open towards an inner end of said gasket, said base portion having a series of peripherally spaced-apart fluid ports therethrough connected to said chamber, a heel flap portion at an outer end of said gasket operatively-connected peripherally to said base portion in an opposed seating relationship with said ports, said heel portion normally defining a peripherally open fluid passageway to said ports, and said heel portion being pressure-sensitive along its extent to progressively seat upon said ports and close-off fluid flow therethrough.

References Cited in the file of this patent

UNITED STATES PATENTS

| | | |
|---|---|---|
| 2,439,242 | Curtis | Apr. 6, 1948 |
| 2,561,296 | Stout | July 17, 1951 |
| 2,614,793 | Storm | Oct. 21, 1952 |
| 2,638,362 | Sherman et al. | May 12, 1953 |
| 2,677,560 | Cornelius | May 4, 1954 |
| 2,709,092 | Wallace | May 24, 1955 |